Patented Aug. 12, 1941

2,252,403

UNITED STATES PATENT OFFICE 2,252,403

METHOD OF PRODUCING PHYTOLIPASES POOR IN TOXIC ALBUMINS

Ernst Waldschmidt-Leitz and Ottomar Neumann, Prague, Czechoslovakia, assignors to August Karreth, acting under the firm: Luitpold-Werk, Chemisch-pharmazeutische Fabrik, Munich, Germany No Drawing. Application March 7, 1938, Serial No. 194,402. In Germany March 4, 1937

12 Claims. (Cl. 195—65)

The invention relates to phytolipase preparations and methods of producing the same. The phytolipases which are fat splitting enzyme preparations obtained from vegetable materials, are usually associated with toxic albumins. As an example, Ricinus lipase obtained from Ricinus seeds contains ricin, the highly active toxic albumin of the Ricinus seed.

More particularly, the present invention relates to phytolipase preparations which are poor in toxic albumins, and to methods of producing the same. These phytolipase preparations which are poor in toxic albumins, are mainly destined for therapeutical uses.

The toxic albumins contained in usual phytolipase preparations account for the agglutinating power of the said preparations. As an example, the extract made from an acetone dry preparation of Ricinus lipase has an agglutinating action, even when diluted to 1:192,000. The improved phytolipase preparations according to the invention, however, are practically free from toxic albumins. Ricinus lipase preparations particularly poor in ricin according to the invention contain so little ricin that the extract prepared from the acetone dry preparation, even in a concentration of 1:2000, does not have an agglutinating action. In certain cases it is not necessary to reduce the quantity of toxic albumins which are present in the phytolipases, to the same degree as in the above mentioned example. Phytolipase preparations which, in the form of an extract prepared from the acetone dry preparation just fail to have an agglutinating action when diluted to 1:15,000, or 1:20,000, are to be regarded as poor in toxic albumins and as being covered by the present invention, the said preparations only containing about 10 per cent of the toxic albumin content of the usual phytolipase preparations which do not come within the scope of the present invention. For convenience of description such phytolipase preparations will be described in the claims as effectively free of toxic albumins.

The most important phytolipase preparation poor in toxic albumins according to the present invention is Ricinus lipase poor in ricin. But other phytolipases poor in toxic albumins are important as well, for example, the phytolipase preparation poor in abrin, which is obtained from *Abrus precatorius*, or the phytolipase preparations poor in toxic albumins, which are prepared from *Chelidonium majus* (celandine) or from kola-nuts. The phytolipase preparations poor in toxic albumins according to the invention, which have been made from the raw materials mentioned above, are valuable remedies against dyspepsia due to insufficient quantities of stomach-pancreas lipases.

Another embodiment of the present invention is the process of separating the toxic albumins from the phytolipases. It consists in causing the aqueous solutions of salts, particularly alkali metal salts of organic acids with 4 or more carbon atoms, to act on the emulsions prepared from vegetable raw materials and containing the phytolipases. A large variety of organic acids with 4 or more carbon atoms, such as aliphatic saturated or unsaturated acids, hydroaromatic acids, aliphatic hydroxy acids, aromatic acids, aromatic hydroxy-acids, amino-acids, acids containing nitro groups, heterocyclic acids, may be used. The preferred salts of organic acids with 4 or more carbon atoms to be employed according to the present invention are salts that render it possible to separate the toxic albumins from the lipases without, at the same time, materially impairing the lipatic activity. Among the numerous organic acids with 4 or more carbon atoms from the various classes mentioned above, isovaleric acid has proved most useful for the process according to the invention. By employing isovaleric acid, both practically complete separation of the toxic albumins and preservation of the lipatic efficiency of the lipase preparations are rendered possible. In addition to isovaleric acid, hippuric acid is particularly suitable for the process according to the invention, inasmuch as it has the advantage of being completely odorless. Among the numerous other acids which have been tested, the following may be mentioned as being well adapted for the process according to the invention:

Ricinoleic, caprylic, lauric, gluconic, acrylic, tiglic, malonic, succinic, glutaric, fumari, citric, benzoic, salicylic, orthonitribenzoic, paraoxybenzoic, gallic, mandelic, cinnamic, nicotinic acids.

Partly, the separation of the toxic albumins, when effected by these acids, is not as complete as when isovaleric acid is used; partly, these acids somewhat impair the lipatic activity. Nevertheless, the effect which can be secured by these acids, is sufficient for them to be used for the production of phytolipases poor in toxic albumins. When using acids that somewhat impair the lipatic activity of the phytolipases, it is preferable to carry out the separation at a temperature as low as possible, for example, at refrigerator temperature.

Furthermore, it has proved advantageous to adjust the solutions of salts of organic acids with 4 or more carbon atoms, which are to be used for the treatment, to a pH of about 7.

One embodiment that has frequently proved useful in the practice of the invention, consists in first preparing from the vegetable materials an emulsion to which an aqueous solution of about 1 to 10 per cent of alkali metal salts of organic acids with 4 or more carbon atoms is added. After an interaction of several hours—in many cases a reaction time of 15 to 48 hours has proved useful—separation of the oily and aqueous layers is effected, for example, by centrifuging. During this separation the lipases which are practically free from toxic albumins, remain in the oily layer. The toxic albumins, on the other hand, pass into the aqueous phase; it can be proved by analysis that the efficiency of the toxic albumins, to a large extent, has been preserved in the aqueous phase. Hence, in the process according to the invention, it is not a matter of the toxic albumins being blocked by the action of the organic acids, but of the said toxic albumins being actually separated from the phytolipases.

The cream which has been prepared in the described manner, in addition to the lipases freed from toxic albumins, contains more or less water. The water can be removed from the oil emulsions of the lipases by adding glycerin or another dehydrating polyhydric alcohol to the water containing emulsions, and thereafter effecting another separation of the phases by centrifuging. If necessary, in order to secure a complete dehydration, the addition of glycerin followed by separation of the phases has to be repeated. Whether the lipase solutions are free from toxic albumins or still contain them, the elimination of the water from the oil emulsions is an important step, the stability of the lipases being increased thereby.

When a pharmaceutical preparation which is poor in ricin and does not exhibit the purgative effects of castor oil, is to be obtained from Ricinus lipase it is preferable to remove from the oil emulsion—prepared in the manner described in the preceding paragraph and containing glycerin and Ricinus lipase poor in ricin—the majority of the castor oil by a solvent such as benzine, or to displace it by another fat, wax, or the like. It is an advantage to retain certain amounts of oil in the preparations, the stability of the lipase in many cases being increased thereby. Finally, by means of adsorbents, solid preparations may be obtained, if desired.

In order to ascertain the effect secured by the process according to the invention, it is necessary to test the agglutinating power of both the starting material and the final products. With this object in view, first acetone dry preparations are made. To the solutions to be tested acetone is added till the entire oil and water has passed into the acetone phase; the lipase which is precipitated thereby, is separated by centrifuging. Then the precipitate is twice washed with acetone and finally dried in vacuo.

In order to estimate the agglutinating power, a test solution is prepared from 2 parts of blood and 98 parts of physiological sodium chloride solution. The acetone dry preparation is extracted with physiological sodium chloride solution, and this extract is then progressively diluted. For each test, equal volumes of blood solution and extract were mixed and allowed to stand for 24 hours. In every instance it was determined how far the dilution of the extract had to be carried, in order to cause the agglutinating action to disappear.

In the various tests, either the border concentration at which agglutination was still to be observed, or the border concentration at which the agglutinating effect had just disappeared, were ascertained. In every subsequent test the dilution was double the amount as in the previous one.

The process according to the invention can be modified in various respects. The following examples are intended to illustrate several embodiments of the invention; but they are not to be regarded as limitations.

*Example 1*

By triturating Ricinus seeds with water, an emulsion is prepared in a known manner. This emulsion is separated from the other seed constituents by centrifuging, a cream containing the lipase and serving as starting material being thus obtained. This cream is essentially a castor oil emulsion but, inter alia, also contains fair amounts of albuminous substance and the lipase of the Ricinus seed as well as ricin.

150 grams of this cream containing 10 phytolipase units per gram, i. e., a total of 1500 phytolipase units, are mixed with 200 cc. of a 5 per cent isovaleric acid solution. By addition of NaOH, the pH of the isovaleric acid solution had been adjusted to 7.2. Then the cream admixed with isovaleric acid is allowed to stand at 47° C. for 24 hours, whereupon it is centrifuged. 95 grams of a cream which contains 14.2 phytolipase units per gram, are obtained as an oily layer in this manner. The recovered amount of lipase, accordingly, amounts to 1350 phytolipase units, i. e., to 90 per cent of the starting material. This lipase is practically free from ricin, for the acetone dry preparation made from this product, even in a concentration of 1:2000, does not have an agglutinating action, whereas the ricin content of the starting material was so large that, even in a dilution of 1:192,000, an agglutinating action was still to be observed.

In order to remove the water from the oil solution containing the lipase, 50 grams of this solution containing 14.2 phytolipase units per gram are twice consecutively mixed with 150 cc. of 87 per cent glycerin and then centrifuged. 23 grams of a dehydrated cream containing 24.8 phytolipase units per gram are thus obtained. The dehydration of the preparation does not, therefore, involve any considerable losses of lipase, the yield of lipase amounting to about 80 per cent based on the starting material employed.

When using alkali metal salts of isovaleric acid for the elimination of ricin, it is possible to preserve 100 per cent of the lipase effect of the starting material, provided a practically complete elimination of ricin is not necessary. This is illustrated by the following experiment:

150 grams of a cream containing 12.6 phytolipase units per gram, i. e., a total of 1890 phytolipase units are mixed with 200 cc. of a 5 per cent isovaleric acid solution which has been adjusted to a pH=7.2 by addition of NaOH. This mixture after being allowed to stand at 30° C. for 20 hours gives, on centrifuging, 109 grams of a cream with 17.3 phytolipase units per gram. The total yield of phytolipase, therefore, amounts to 1886 phytolipase units, i. e., practically the same amount which was present in the starting material.

The above experiment differs from the first one by a slightly lower temperature and a shorter time of reaction. The agglutinating power of the purified preparation is slightly higher, accordingly. The border concentration at which agglutination was still to be observed, is 1:4000. This slightly higher agglutinating power of the purified preparation, however, involves a practically 100 per cent recovery of the lipase employed, as has been mentioned before.

*Example 2*

150 grams of a cream prepared according to Example 1 and containing 11.5 phytolipase units per gram, i. e., a total of 1725 units, are mixed with 200 cc. of a 5 per cent ricinoleic acid solution which has been adjusted to a pH=7.2 by addition of NaOH. This mixture after being allowed to stand at refrigerator temperature for 15 hours gives, on centrifuging, 130 grams of a cream containing 6.5 phytolipase units per gram, i. e., a total of 845 phytolipase units. The agglutinating power of the acetone dry preparation is considerably diminished. Whereas in the case of the starting material agglutination was still to be observed at a dilution of 1:192,000, the purified preparation showed a border concentration of the agglutinating action of 1:6000. The yield of lipase, in this example, is not as good as in Example 1; besides, elimination of the agglutinating action is less complete.

*Example 3*

150 grams of a cream with 12.8 phytolipase units per gram, i. e., a total of 1920 phytolipase units, are mixed with 200 cc. of a 5 per cent caprylic acid solution which has been adjusted to a pH=7.2 by addition of NaOH. This mixture was allowed to stand at 14 to 16° C. for 15 hours. On centrifuging, 100 grams of a cream with 10 phytolipase units per gram were recovered, the yield based on lipase amounting to about 50 per cent. The agglutinating power of this preparation was stronger than that of the other preparations. The border concentration at which agglutination was still to be observed, was 1:12,000.

It is true that caprylic acid is inferior to isovaleric acid regarding separation of ricin and preservation of Ricinus lipase; this acid, however, will be sufficient for many practical purposes.

*Example 4*

150 grams of a cream prepared according to Example 1 and containing 10.5 phytolipase units per gram, i. e. a total of 1575 phytolipase units, are admixed with 200 cc. of an 8.8 per cent hippuric acid solution which has been adjusted to a pH=7.2 by addition of NaOH, and allowed to stand at 40° C. for 24 hours. By centrifuging there are obtained 120 grams of a cream containing 9.5 phytolipase units per gram, i. e., a total of 1140 phytolipase units. The agglutinating power of the acetone dry preparation which, in the case of the starting material, was still to be measured at a dilution of 1:192,000, after the treatment with hippuric acid is only to be observed at a border concentration of 1:2000.

We claim:

1. A method of producing phytolipases effectively free of toxic albumins which comprises treating oil emulsions containing the phytolipases with aqueous solutions of water soluble salts of organic acids with 4 or more carbon atoms.

2. A method of producing phytolipases effectively free of toxic albumins which comprises treating oil emulsions containing the phytolipases with aqueous solutions of alkali metal salts of organic acids with 4 or more carbon atoms.

3. A method of producing phytolipases effectively free of toxic albumins which comprises treating oil emulsions containing the phytolipases with aqueous solutions of water soluble salts of organic acids with 4 or more carbon atoms of a pH of about 7.

4. A method of producing phytolipases effectively free of toxic albumins which comprises treating oil emulsions containing the phytolipases with aqueous solutions of water soluble salts of organic acids with 4 or more carbon atoms of a concentration of about 1 to 10 per cent.

5. A method of producing phytolipases effectively free of toxic albumins which comprises treating oil emulsions containing the phytolipases with aqueous solutions of water soluble salts of organic acids with 4 or more carbon atoms during 15 to 48 hours, and thereafter separating the oily and aqueous phases.

6. A method of producing phytolipases effectively free of toxic albumins which comprises treating oil emulsions containing the phytolipases with aqueous solutions of water soluble salts of organic acids with 4 or more carbon atoms during 15 to 48 hours, and dehydrating the fat emulsion containing the phytolipases by adding a dehydrating polyhydric alcohol and thereafter centrifuging the mixture.

7. A method of producing phytolipases effectively free of toxic albumins which comprises treating oil emulsions containing the phytolipases with aqueous solutions of water soluble salts of organic acids with 4 or more carbon atoms during 15 to 48 hours, dehydrating the fat emulsion containing the phytolipases by adding a dehydrating polyhydric alcohol and thereafter centrifuging the mixture and freeing the phytolipases from adhering oil by treating said phytolipases with a solvent for the oil such as benzine.

8. A method of producing phytolipases effectively free of toxic albumins, which comprises treating oil emulsions containing the phytolipases and toxic albumins with an aqueous solution of a water soluble salt of an organic acid having 4 or more carbon atoms in the molecule selected from the group consisting of isovaleric, ricinoleic, caprylic, lauric, gluconic, acrylic, tiglic, malonic, succinic, glutaric, fumaric, citric, benzoic, salicylic, orthonitrobenzoic, paraoxybenzoic, gallic, mandelic, cinnamic, hippuric, and nicotinic acids until the toxic albumins to be removed separate out from the phytolipases in the aqueous medium, and separating the aqueous medium from the mixture to remove said toxic albumins.

9. A method of producing phytolipases effectively free of toxic albumins, which comprises treating oil emulsions containing the phytolipases and toxic albumins with an aqueous solution of a water soluble salt of isovaleric acid until the toxic albumins to be removed separate out from the phytolipases in the aqueous medium, and separating the aqueous medium from the mixture to remove said toxic albumins.

10. A method of producing phytolipases effectively free of toxic albumins, which comprises treating oil emulsions containing the phytolipases and toxic albumins with an aqueous solution of a water soluble salt of hippuric acid until the toxic albumins to be removed separate out from the phytolipases in the aqueous medium, and separating the aqueous medium from the mixture to remove said toxic albumins.

11. A method of producing phytolipases effectively free of toxic albumin as defined in claim 8 wherein the treatment with the aqueous solution is carried on at refrigerator temperature.

12. A method of producing phytolipases effectively free of toxic albumin as defined in claim 8 wherein the aqueous solution is adjusted to a pH value of about 7.

ERNST WALDSCHMIDT-LEITZ.
OTTOMAR NEUMANN.